United States Patent
Ozue (10) Patent No.: US 6,970,325 B2
(45) Date of Patent: Nov. 29, 2005

(54) MAGNETIC HEAD APPARATUS, MAGNETIC REPRODUCING METHOD, AND MAGNETIC REPRODUCING APPARATUS IN LINEAR TAPE SYSTEM

(75) Inventor: Tadashi Ozue, Kanagawa (JP)

(73) Assignee: Sony Corporation, Tokyo (JP)

( * ) Notice: Subject to any disclaimer, the term of this patent is extended or adjusted under 35 U.S.C. 154(b) by 157 days.

(21) Appl. No.: 10/279,342

(22) Filed: Oct. 24, 2002

(65) Prior Publication Data

US 2003/0090837 A1 May 15, 2003

(30) Foreign Application Priority Data

Oct. 24, 2001 (JP) .................. P2001-326438

(51) Int. Cl.[7] .................. G11B 21/20; G11B 5/48
(52) U.S. Cl. .................. 360/241.1
(58) Field of Search .................. 360/241.1, 241, 360/240, 261.1, 260, 290, 291, 110, 316

(56) References Cited

U.S. PATENT DOCUMENTS

| | | | | |
|---|---|---|---|---|
| 5,917,671 A | * | 6/1999 | Kaaden et al. | ............ 360/77.12 |
| 6,535,351 B1 | * | 3/2003 | Yip et al. | .............. 360/114.01 |
| 2001/0015870 A1 | * | 8/2001 | Saliba | ......................... 360/122 |

* cited by examiner

Primary Examiner—Julie Anne Watko
(74) Attorney, Agent, or Firm—Sonnenschein, Nath & Rosenthal LLP (57) ABSTRACT

A linear tape system has a multi-reproducing head MRh comprising a plurality of reproducing heads Rh each of which corresponds to one recording track Tr. Each reproducing head of the multi-reproducing head is arranged with a displacement in a width direction of the recording track. An entire width MRhw of the multi-reproducing head is enlarged larger than a width Trw of the recording track. In this manner, the linear tape system can reproduce the recording track recorded in a narrow width and provide a higher recording density.

9 Claims, 8 Drawing Sheets

Tr···RECORDING TRACK  Rh2···REPRODUCING HEAD
MRh···MULTI-REPORDUCING HEAD  Rh3···REPRODUCING HEAD
1···MAGNETIC TAPE  Rh4···REPRODUCING HEAD
Rh1··· REPRODUCING HEAD

FIG. 5

MRh···MULTI-REPORDUCING HEAD    Rh1···REPRODUCING HEAD
1B···MAGNETIC TAPE    Rh2···REPRODUCING HEAD
   Rh3···REPRODUCING HEAD
   Rh4···REPRODUCING HEAD

FIG. 6

Tr···RECORDING TRACK
1B···MAGNETIC TAPE

MAGNETIC HEAD APPARATUS, MAGNETIC REPRODUCING METHOD, AND MAGNETIC REPRODUCING APPARATUS IN LINEAR TAPE SYSTEM

RELATED APPLICATION DATA

The present invention claims priority to Japanese Application No. P2001-326438 filed Oct. 24, 2001, which application is incorporated herein by reference to the extent permitted by law.

BACKGROUND OF THE INVENTION

1. Field of the Invention

The present invention relates to a magnetic head apparatus, a magnetic reproducing method, and a magnetic reproducing apparatus in a linear tape system. More particularly, the present invention relates to a technology of reproducing a narrow recording track according to non-tracking mode in a linear tape system.

2. Description of Related Art

A conventional linear tape system uses a magnetic tape T whose recording track Tr has a track width Trw of 10 to 20 μm. A reproducing head Rh has a head width Rhw almost the same as that of the recording track Tr (see FIG. 7).

The tracking accuracy just needs to be one to several microns because the recording track Tr has the track width Trw of 10 to 20 μm.

Figure 7:
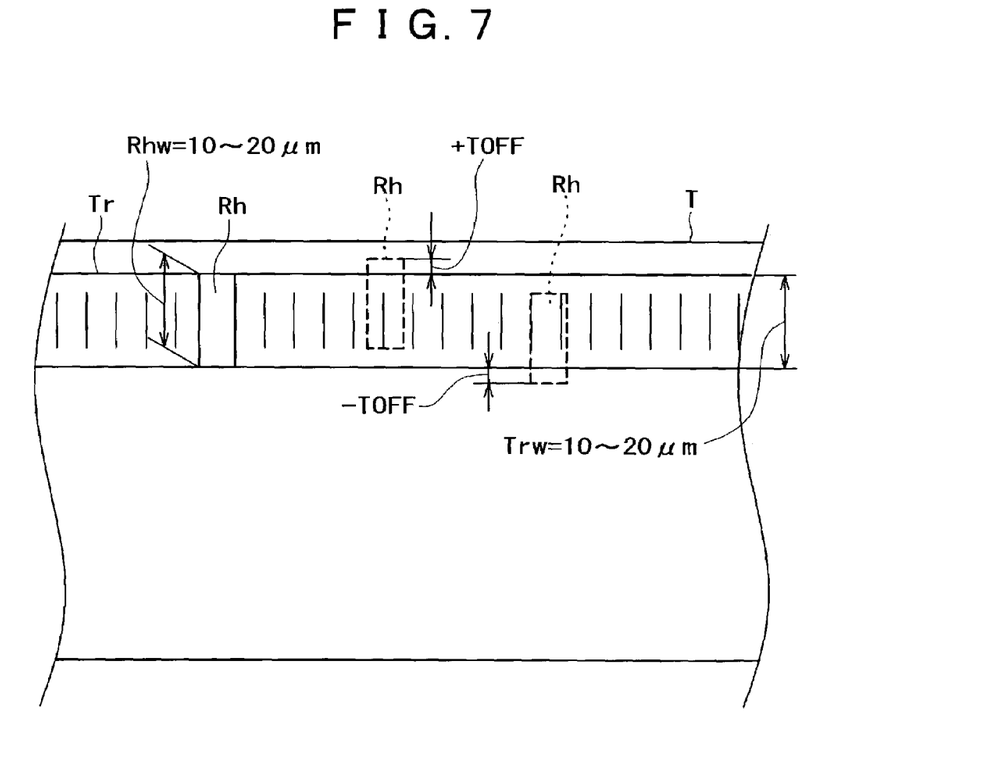
FIG. 7 schematically shows physical relationship among a relatively wide conventional recording track, a recording head, and a reproducing head.

If a fluctuation of, e.g., ±2 μm (off-track amount: ±TOFF) occurs with reference to the width (10 to 20 μm) of the recording track Tr, a signal reproduced from the reproducing head Rh is subject to degradation of 2/10 to 2/20. This is assumed to be a tolerance. Though FIG. 7 represents as if the reproducing head Rh moves up and down against the recording track Tr, the figure shows relative positions. Actually, the recording track Tr moves up and down while the magnetic tape moves.

A fluctuation amount for the magnetic tape T is equivalent to the off-track amount ±TOFF according to the relationship between the reproducing head Rh and the recording track Tr. The off-track amount ±TOFF indicates an amount of deviation in a width direction based on a state where the reproducing head Rh and the recording track Tr are centered on each other in the width direction. Even if an off-track state occurs, there is provided a limit value of the off-track amount ±TOFF for allowing the reproducing head Rh to reproduce a recorded signal. This off-track amount ±TOFF is referred to as an allowable off-track amount. The allowable off-track amount depends on performance of the reproducing head Rh and is therefore designed individually.

SUMMARY OF THE INVENTION

In recent years, due to the development of thin film magnetic heads, recording and reproducing heads having a head width of one to several microns have come into practical use.

Figure 8:
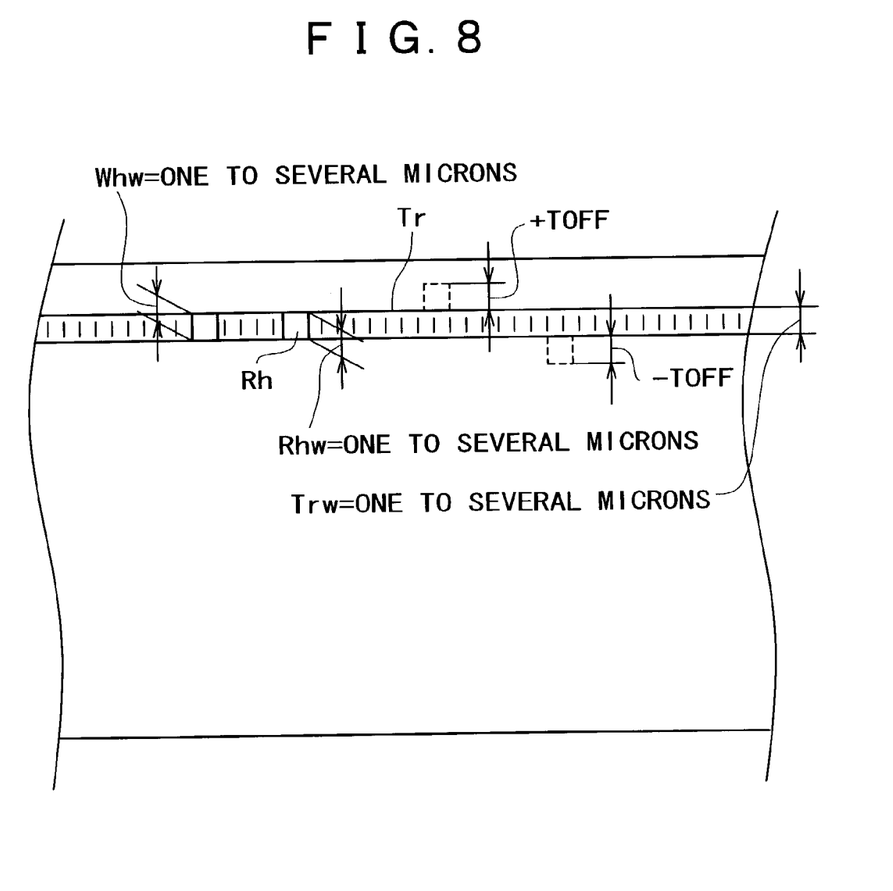
FIG. 8 schematically shows physical relationship among a narrowed recording track and conventional reproducing heads.

Since the head width Whw of the recording head Wh is narrowed, the track width Trw of one to several microns can be provided practically. According to the above-mentioned tracking accuracy, however, the off-track amount ±TOFF exceeds the track width Trw, making it impossible to read a recorded signal (see FIG. 8).

For example, let us suppose that the track width Trw is 2 μm and the fluctuation of the magnetic tape T is ±2 μm. Then, the off-track amount ±TOFF for the track width Trw becomes 1/1. This exceeds the above-mentioned allowable off-track amount, so the reproduced signal from recorded truck can not be obtained. The reproducing heads Rh in FIG. 8 indicated by broken lines show that the heads exceed the allowable off-track amount.

Improving the tracking accuracy can decrease the off-track amount ±TOFF relatively to the track width Trw. However, the tracking accuracy largely depends on mechanical factors. It is difficult to further improve the tracking accuracy.

In particular, movement of the magnetic tape T is restricted by a tape guide or the like at tape edges. The dimensional accuracy of tape edges is generally measured in units of microns. In other words, the tap edge causes unevenness in units of microns. The unevenness directly reflects a fluctuation of the magnetic tape T in the width direction. Even if an effort is made to improve the tracking accuracy, it is difficult to decrease the off-track amount ±TOFF to a level smaller than microns.

If the track width Trw can be narrowed in a linear tape system, the magnetic tape T causes a fluctuation over the tracking accuracy, disabling tracking. Thus no tracks can be reproduced. Accordingly, there is a limitation on providing a higher recording density.

It is therefore an object of the present invention to enable reproduction of a track recorded in a narrow width and provide a higher recording density.

To solve the above-mentioned problems, a magnetic head apparatus according to the present invention has a multi-reproducing head comprising a plurality of reproducing heads each corresponding to one recording track in a linear tape system. Each reproducing head of the multi-reproducing head is arranged with a displacement in a width direction of the recording track. An entire width of the multi-reproducing head is enlarged larger than a width of the recording track.

The multi-reproducing head may comprise four reproducing heads. A track width of each reproducing head may be half a recording track width. The four reproducing heads of the multi-reproducing head may be arranged adjacently to each other with a displacement of half a recording track width in a width direction of a recording track. The four reproducing heads of the multi-reproducing head may be arranged so that second and third reproducing heads thereof are set to on-track positions on a recording track in a width direction thereof.

The multi-reproducing head may comprise three reproducing heads. A track width of each reproducing head may be the same as a recording track width. The three reproducing heads of the multi-reproducing head may be arranged adjacently to each other with a displacement of half a recording track width in a width direction of a recording track. The three reproducing heads of the multi-reproducing head may be arranged so that a second reproducing head thereof is set to an on-track position on a recording track in a width direction thereof.

A magnetic reproducing method in a linear tape system comprises the steps of: using a multi-reproducing head comprising a plurality of reproducing heads each corresponding to one recording track; arranging each reproducing head of the multi-reproducing head with a displacement in a width direction of the recording track; and reading a signal recorded on a magnetic tape for reproduction in non-tracking mode using the multi-reproducing head whose width is larger than a width of the recording track.

Further, a magnetic reproducing apparatus according to the present invention has a multi-reproducing head comprising a plurality of reproducing heads each corresponding to one recording track in a linear tape system. Each reproducing head of the multi-reproducing head is arranged with a displacement in a width direction of the recording track. An entire width of the multi-reproducing head is enlarged larger than a width of the recording track.

According to the present invention, any of multi-reproducing heads can fully scan a recording track if a magnetic tape causes a fluctuation relatively to the multi-reproducing heads in a track width direction. Therefore, the use of so-called non-tracking reproduction can completely reproduce data and provide high-density recording in a linear tape system.

DETAILED DESCRIPTION OF THE PREFERRED EMBODIMENTS

Embodiments of the present invention will be described in further detail with reference to the accompanying drawings.

Figure 1:
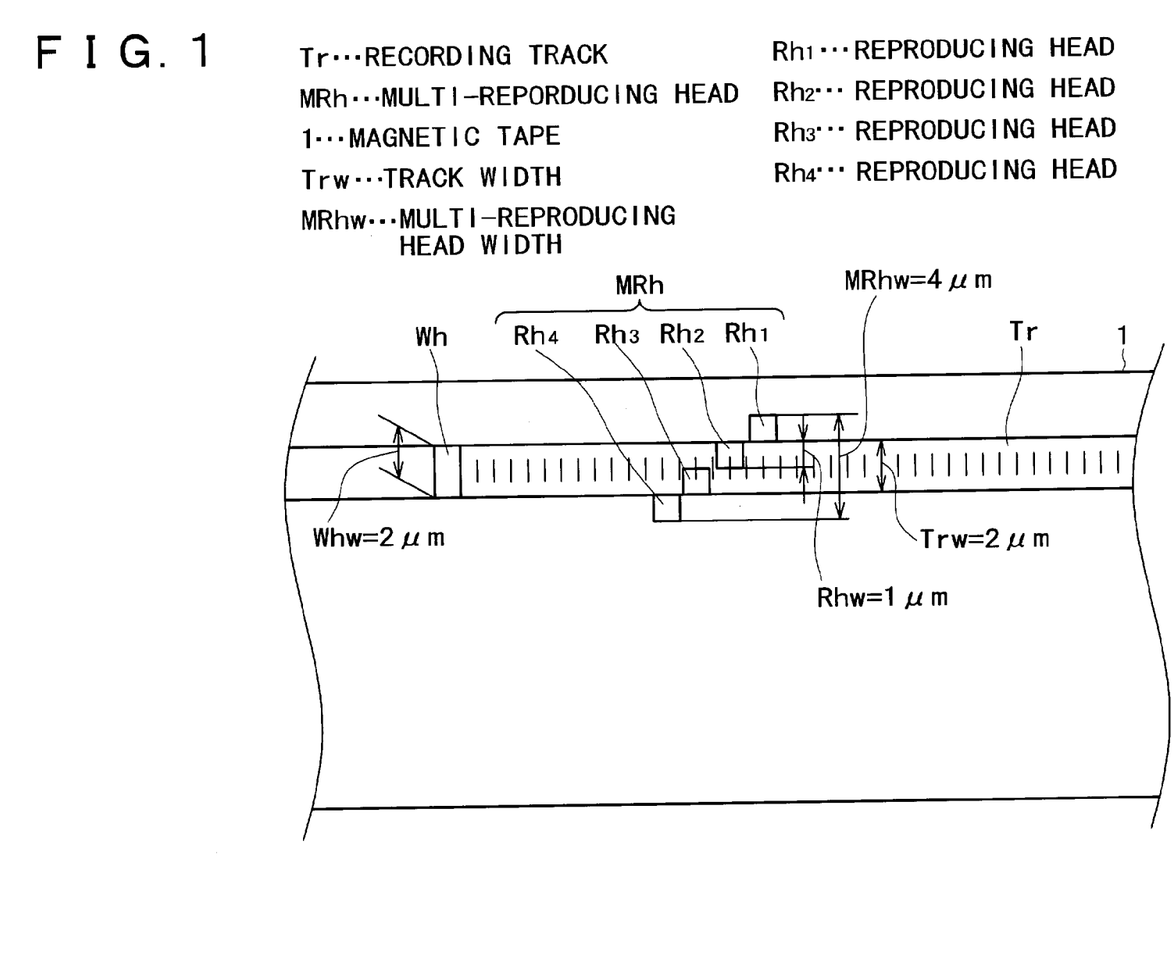
FIG. 1 shows a first embodiment of a magnetic head apparatus according to the present invention, schematically diagramming physical relationship between a multi-reproducing head and a recording track when these are centered to each other.
Figure 2:
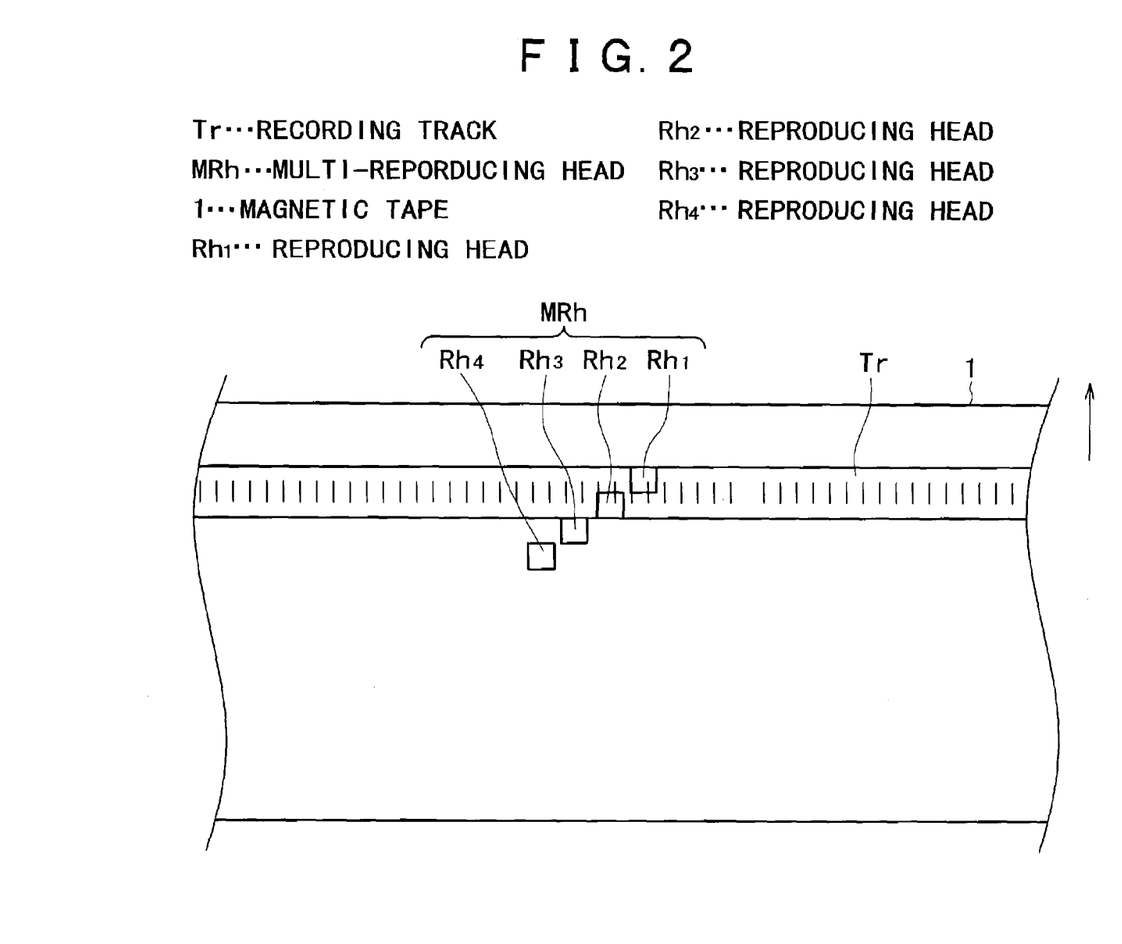
FIG. 2 shows the first embodiment of the magnetic head apparatus according to the present invention, schematically diagramming physical relationship between the reproducing heads and the recording track when a magnetic tape deviates upward from a state in FIG. 1.
Figure 3:
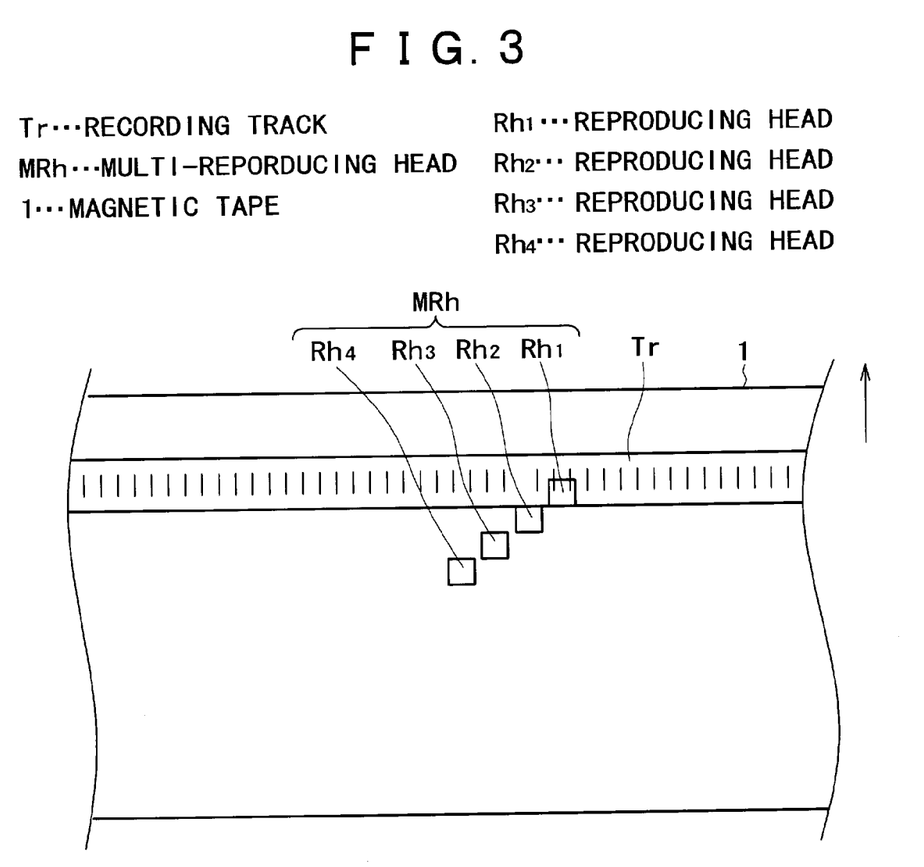
FIG. 3 shows the first embodiment of the magnetic head apparatus according to the present invention, schematically diagramming physical relationship among the reproducing heads and the recording track when the magnetic tape further deviates upward from a state in FIG. 2.

FIGS. 1 through 3 are explanatory diagrams showing the first embodiment of the present invention and schematically representing physical relationship among a recording track Tr and reproducing heads Rh. The first embodiment is applied to a linear tape system that reproduces a recorded signal from a narrowed recording track Tr using a plurality of reproducing heads Rh (a multi-reproducing head MRh). Each reproducing head Rh has a width approximately half the track width of the recording track Tr. Though not shown in the figures, the recording head Wh and/or the reproducing heads Rh are provided at specified positions corresponding to a tape contact surface of a magnetic head apparatus.

The magnetic head apparatus is used for a magnetic recording and reproducing apparatus that records and reproduces data recorded on tape-shaped magnetic recording media. For example, the magnetic recording and reproducing apparatus is used for video tape systems, audio tape systems, and data storage tape systems. Further, it is obvious that the present invention may be applied to a magnetic reproducing apparatus for reproduction only.

A magnetic tape 1 contains the recording track Tr with a specified width, e.g., Trw=2 $\mu$m. Such recording track Tr can be easily formed by the recording head Wh having a head width Whw of 2 $\mu$m. Multi-recording tracks Tr (multichannel) can be formed by adjacently providing recording heads Wh as many as the multi-recording tracks along a tape width direction.

The multi-reproducing head MRh comprises four reproducing heads Rh. Each reproducing head Rh has a head width Rhw of 1 $\mu$m. The reproducing heads Rh are adjacently provided along the tape width direction.

Accordingly, two reproducing heads are positioned to one recording track Tr.

The embodiment is described on the premise that the magnetic tape 1 has a fluctuation tolerance of ±2 $\mu$m.

Consequently, the multi-reproducing head MRh has a head width MRhw of 4 $\mu$m in total. When the multi-reproducing head MRh is positioned to a design reference position, two inner reproducing heads Rh2 and Rh3 are positioned on the recording track Tr. Two outer reproducing heads Rh1 an Rh4 are positioned with a displacement for half the width of the recording track Tr therefrom (see FIG. 1). The design reference position is defined to be correspondence between the center of the track width Trw of the multi-reproducing head MRh and that of the track width Trw of the recording track Tr. The four reproducing heads Rh1, Rh2, Rh3, and Rh4 are arranged stepwise along a tape movement direction. This is because adjacently forming a plurality of reproducing heads Rh is difficult in a manufacturing process for thin film magnetic heads.

When the multi-reproducing heads Rh1, Rh2, Rh3, and Rh4 reproduce the recording track Tr with the multi-reproducing head MRh aligned to the above-mentioned reference position, a recorded signal is reproduced by the two reproducing heads Rh2 and Rh3 that scan the recording track Tr (see FIG. 1).

Let us assume that the magnetic tape 1 generates a fluctuation in the track width direction, e.g., the magnetic tape 1 fluctuates 1 $\mu$m upward from the state in FIG. 1. In this case, the upper reproducing heads Rh1 and Rh2 are set to on-track positions on the recording track. The lower reproducing heads Rh3 and Rh4 are set to off-track positions therefrom (see FIG. 2). When the recording track Tr further fluctuates 1 $\mu$m upward (off-track amount ±TOFF=2 $\mu$m), the three reproducing heads Rh2, Rh3, and Rh4 are set to off-track positions. Only the reproducing head Rh1 maintains the on-track position (see FIG. 3) and can reproduce a signal recorded on the recording track Tr.

Accordingly, the recording track Tr can be fully scanned in the tape movement direction. By scanning the recording track Tr, the reproducing head Rh1, Rh2, Rh3, or Rh4 obtains a reproduction signal that is then stored in semiconductor memory. The stored signal can be reconfigured to completely reproduce data, thus providing the so-called non-tracking reproduction.

If the movement of the magnetic tape 1 causes a fluctuation in microns, the reproducing head Rh1 or Rh4 of the multi-reproducing head MRh can scan the recording track Tr. Therefore if the recording track Tr is narrowed, the non-tracking system can reproduce a recorded signal. In other words, the linear tape system can narrow the recording track Tr and provide high-density recording.

By the description about "enlarging an entire width of the multi-reproducing head larger than a width of the recording track" in the appended claim, it is meant that the width is enlarged so much as to ensure reproduction of a recorded signal by any reproducing head Rh even if the magnetic tape causes a fluctuation. Namely, when the recording track fluctuates toward an outer one of a plurality of reproducing heads arranged in a width direction, an entire surface of the outer reproducing head need not completely contact the recording track. If the outer reproducing head is somewhat misaligned to the recording track, it may be satisfactory to be capable of reproducing a signal recorded on the recording track. Therefore, depending on the performance of the reproducing head Rh, the width MRhw of the multi-reproducing head MRh can be made slightly smaller than the sum of the recording track width Trw and the fluctuation amount.

A fluctuation amount of the magnetic tape 1 (recording track) depends on the mechanical accuracy of a tape drive system and the dimensional accuracy of the magnetic tape 1 and can be evaluated at a design stage. Namely, the fluctuation amount of the magnetic tape 1 (recording track) is predetermined as a design value and is finalized by improving dimensional accuracies of the magnetic tape 1, individual parts of the magnetic reproducing apparatus, etc.

When the head width MRhw of the multi-reproducing head MRh is configured to be wider than the track width Trw as mentioned above, the head may read a signal from an adjacent recording track Tr. In such case, the read signal is processed as a noise in the semiconductor memory and data can be completely reproduced by reconfiguring only reproduction signals having a specified address and free from an error signal.

FIGS. 4(a) through 4(c) show a second embodiment of the present invention, schematically diagramming physical relationship among the reproducing heads Rh and the recording track Tr. The second embodiment is applied to a linear tape system that reproduces a recorded signal from a narrowed recording track Tr using a plurality of reproducing heads Rh (a multi-reproducing head MRh). Each reproducing head Rh has a width slightly larger than the track width of the recording track Tr. The second embodiment is particularly appropriate for a magnetic tape where a so-called guard band is formed between recording tracks.

Figure 4:
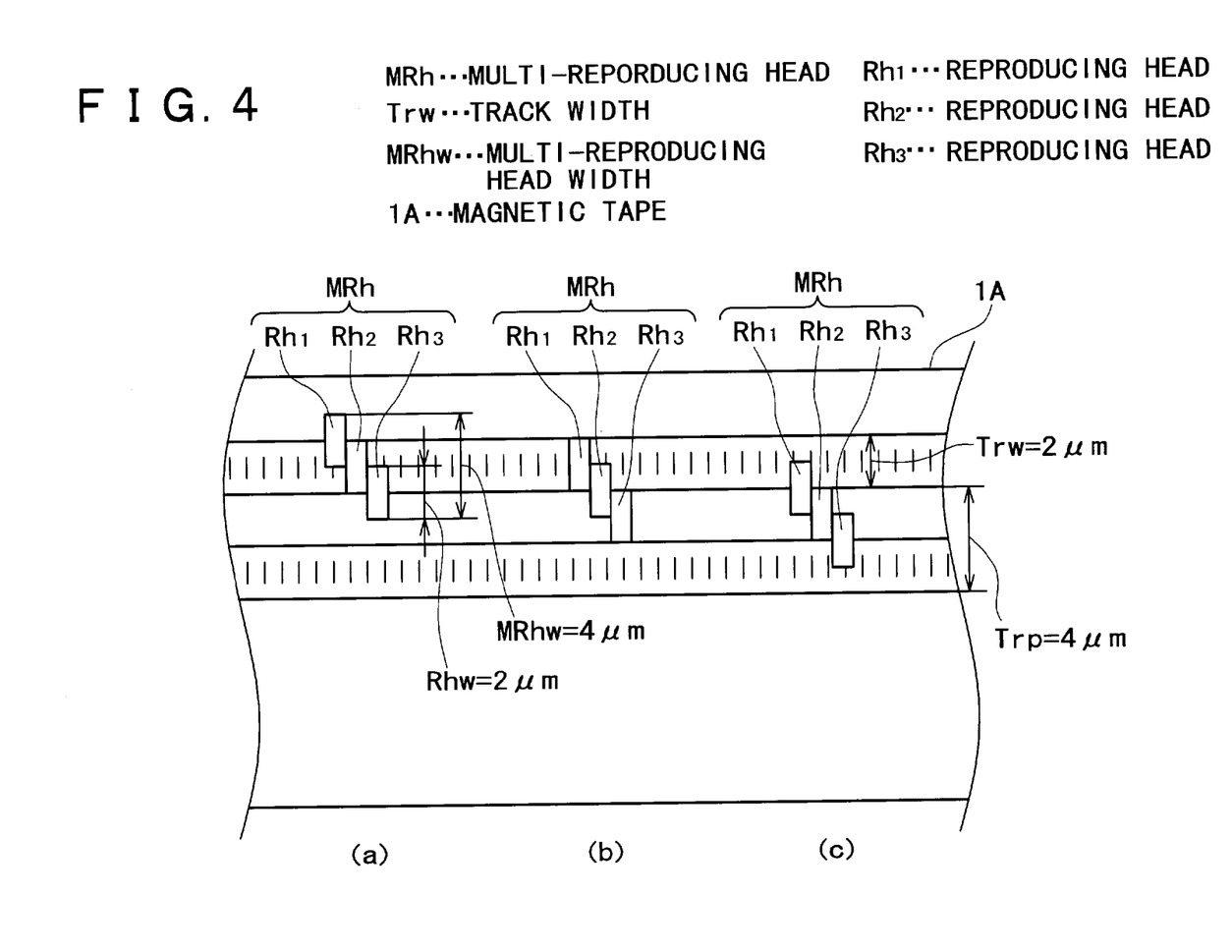
FIG. 4 shows a second embodiment of the magnetic head apparatus according to the present invention, schematically diagramming physical relationship among the reproducing heads and the recording track wherein (a) represents that the multi-reproducing head and the recording track are centered to each other; (b) represents that the reproducing head relatively deviates downward from the state in (a); and (c) represents that the reproducing head relatively deviates further downward from the state in (b)

FIG. 4 shows relative locations of the recording track Tr and the reproducing heads Rh. Actually, the recording track Tr fluctuates and the reproducing heads Rh are fixed. For the sake of the description, the reproducing heads Rh are positioned to one recording track Tr in different ways. FIG. 4(a) shows that the reproducing head Rh2 is set to an on-track position. FIG. 4(b) shows that the reproducing head Rh1 is set to an on-track position. FIG. 4(c) shows that the reproducing head Rh3 is set to an on-track position.

On a magnetic tape 1A, the recording track Tr is formed with a specified width, e.g., Trw=2 $\mu$m, and at a specified track pitch, e.g., Trp=4 $\mu$m. Accordingly, there is formed a guard band GB having a width of 2 $\mu$m between the recording tracks Tr.

The multi-reproducing head MRh comprises three reproducing heads Rh. Each reproducing head Rh has a head width of Rhw=2 $\mu$m. These heads are arranged stepwise in the width direction by a pitch of half the head width. As a result, the multi-reproducing head MRh has the head width MRhw of 4 $\mu$m in total (see FIG. 4(a)).

The reference position of this multi-reproducing head MRh ensures a state in which the reproducing head Rh2 centered at the multi-reproducing head MRh is set to an on-track position on the recording track Tr. Accordingly, the outer reproducing heads Rh1 and Rh3 each are set to off-track positions from the recording track Tr by the half of the head width thereof (see FIG. 4(a)).

The second embodiment is also described on the premise that the magnetic tape 1 has a fluctuation tolerance of ±2 $\mu$m.

When the multi-reproducing head MRh is set to the reference position to reproduce the recording track Tr using the constituent heads Rh1, Rh2, and Rh3, the reproducing head Rh2 contacting the recording track Tr reproduces a reproduction signal (see FIG. 4(a)). The outer reproducing heads Rh1 and Rh3 can also reproduce a reproduction signal. The signal reproduced by the reproducing heads Rh1 and Rh3 is stored in the semiconductor memory and is processed during the reconfiguration.

Let us assume that the magnetic tape 1 causes a fluctuation in the track width, e.g., that the magnetic tape 1 fluctuates 1 $\mu$m upward from the state in FIG. 4(a). At this time, the upper reproducing head Rh1 is set to a non-track position on the recording track Tr. The center reproducing head Rh2 is set to an off-track position from the recording track Tr (see FIG. 4(b)). When the recording track Tr further fluctuates 1 $\mu$m upward (off-track amount ±TOFF=2 $\mu$m), the upper reproducing head Rh1 is set to an off-track position from the recording track Tr by the half of the head width. The remaining half of the head scans the recording track Tr (see FIG. 4(c)). Each reproducing head Rh is designed to reproduce a recorded signal if the half of the head in the width direction can scan the recording track Tr.

In this manner, the multi-reproducing head MRh can fully scan all the recorded signals on the recording track Tr in the tape movement direction. By scanning the recording track Tr, the reproducing head Rh1, Rh2, or Rh3 obtains a reproduction signal that is then stored in semiconductor memory. The stored signal can be reconfigured to completely reproduce data, thus providing the so-called non-tracking reproduction.

If the movement of the magnetic tape 1A causes a fluctuation in microns, the reproducing head Rh1, Rh2, or Rh3 of the multi-reproducing head MRh can scan the recording track Tr. Therefore if the recording track Tr is narrowed, the non-tracking system can reproduce a signal. In other words, the linear tape system can narrow the recording track Tr and provide high-density recording.

This type of multi-reproducing head MRh can be also used to reproduce the recording track Tr having a so-called serpentine recording pattern.

Figure 5:
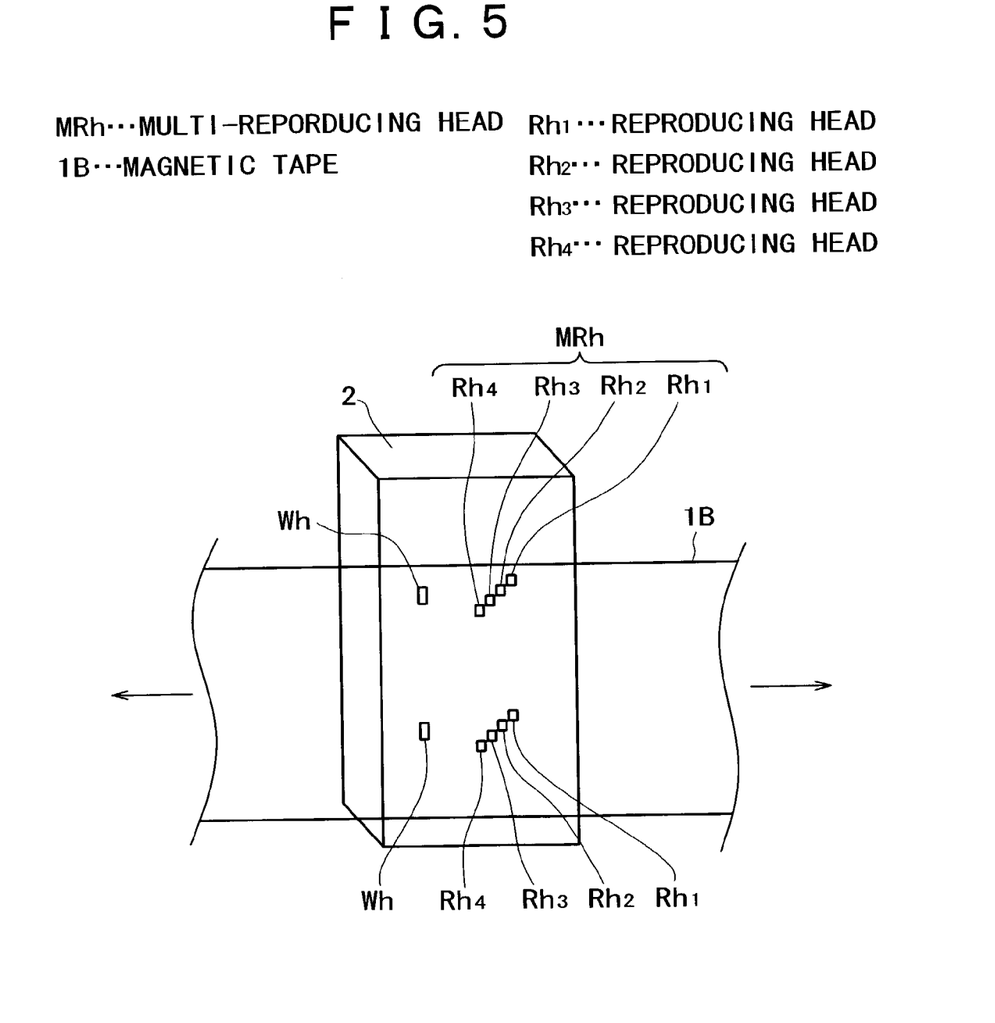
FIG. 5 is a perspective view showing an application of the present invention, schematically representing a magnetic tape T and a magnetic head apparatus.
Figure 6:
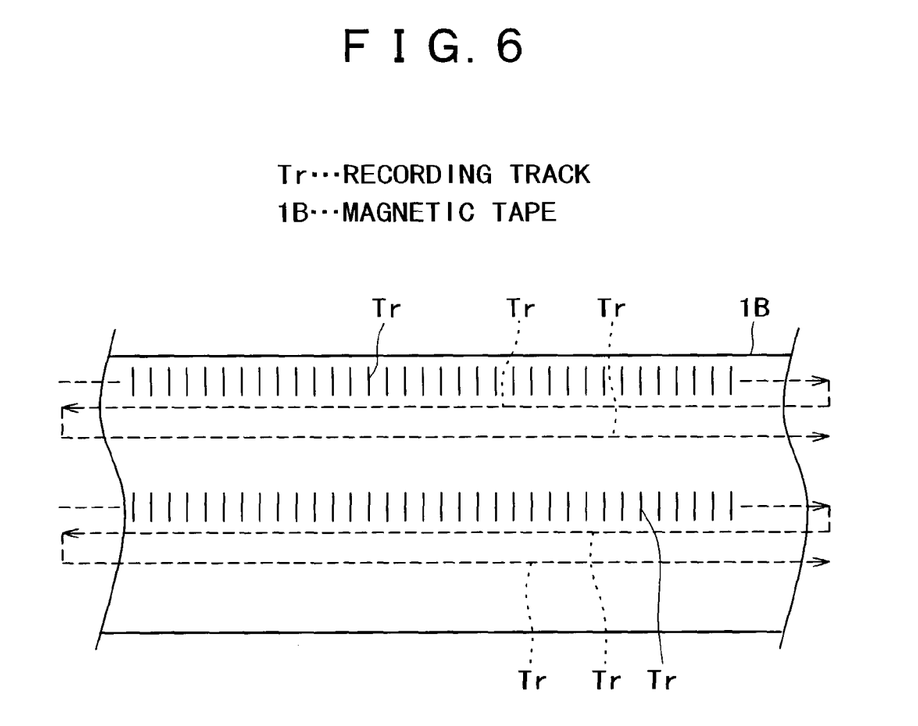
FIG. 6 shows an application of the present invention, schematically diagramming recording tracks recorded on a magnetic tape.

FIGS. 5 and 6 illustrate the serpentine recording pattern. Firstly, data is recorded forward on magnetic tape 1B from one end thereof. When the recording head Wh reaches the other end of the tape in the tape movement direction, the recording head Wh is moved slightly in relative relation to the tape width direction. Then, the tape movement is reversed and data is recorded in the backward direction. When the recording head Wh returns to the start point (one end) of the tape, the recording head Wh is again moved slightly in relative relation to the tape width direction. Then, the tape movement is reversed and data is recorded in the forward direction (see FIG. 5). In this manner, a plurality of recording tracks Tr is created (see FIG. 6). One or more recording heads Wh can be used to create a plurality of single- or multi-channel recording tracks Tr.

The serpentine recording is applied to recording and reproducing apparatuses using a so-called single-reel tape cartridge particularly in a data storage tape system.

After the serpentine recording pattern is used to record the recording tracks Tr, the tracks are reproduced by allowing each head of the multi-reproducing head MRh to correspond to each channel. Like the recording, the tape movement just needs to be reversed at the end of the magnetic tape 1B along the tape movement direction. To create a serpentine recording pattern, it is a general practice to move a magnetic head apparatus 2 having the recording track Wh in the width direction of the magnetic tape 1B. Alternatively, the magnetic tape 1B may be moved in the width direction.

While the above-mentioned embodiments have described provision of one recording track Tr and a plurality of reproducing heads (multi-reproducing head MRh), the present invention is not limited thereto. It may be preferable to provide a plurality of recording tracks Tr (multi-recording track) corresponding to each head of the multi-reproducing head MRh.

It should also be understood that specific shapes or structures of the parts described in the above-mentioned embodiments serve just as examples embodying the present invention and should not limit the technical scope of the present invention.

What is claimed is:

1. A magnetic head apparatus in a linear tape system, comprising:
    a multi-reproducing head comprising at least four reproducing heads each corresponding to one recording track;
    each reproducing head of the multi-reproducing head is arranged with a displacement in a width direction of the recording track; and
    an entire width of the multi-reproducing head is enlarged larger than a width of the recording track; wherein
    a track width of each reproducing head is half a recording track width.

2. The magnetic head apparatus in a linear tape system according to claim 1, wherein
    the at least four reproducing heads of the multi-reproducing head are arranged adjacently to each other with a displacement of half a recording track width in a width direction of a recording track.

3. The magnetic head apparatus in a linear tape system according to claim 2, wherein
    the at least four reproducing heads of the multi-reproducing head are arranged so that second and third reproducing heads thereof are set to on-track positions on a recording track in a width direction thereof.

4. A magnetic reproducing method in a linear tape system, comprising the steps of:
    using a multi-reproducing head comprising at least four reproducing heads each corresponding to one recording track;
    arranging each reproducing head of the multi-reproducing head with a displacement in a width direction of the recording track; and
    reading a signal recorded on a magnetic tape for reproduction in non-tracking mode using the multi-reproducing head whose width is larger than a width of the recording track, wherein
    a track width of each reproducing head is half a recording track width.

5. The magnetic reproducing method in a linear tape system according to claim 4, wherein:
    the at least four reproducing heads of the multi-reproducing head are arranged adjacently to each other with a displacement of half a recording track width in a width direction of a recording track.

6. The magnetic reproducing method in a linear tape system according to claim 5, wherein:
    the at least four reproducing heads of the multi-reproducing head are arranged so that second and third reproducing heads thereof are set to on-track positions on a recording track in a width direction thereof.

7. A magnetic reproducing apparatus in a linear tape system, comprising:
    a multi-reproducing head comprising at least four reproducing heads each corresponding to one recording track;
    each reproducing head of the multi-reproducing head is arranged with a displacement in a width direction of the recording track; and
    an entire width of the multi-reproducing head is enlarged larger than a width of the recording track, wherein
    a track width of each reproducing head is half a recording track width.

8. The magnetic reproducing apparatus in a linear tape system according to claim 7, wherein
    the at least four reproducing heads of the multi-reproducing head are arranged adjacently to each other with a displacement of half a recording track width in a width direction of a recording track.

9. The magnetic reproducing apparatus in a linear tape system according to claim 8, wherein
    the at least four reproducing heads of the multi-reproducing head are arranged so that second and third reproducing heads thereof are set to on-track positions on a recording track in a width direction thereof.

* * * * *